United States Patent [19]  [11] 4,059,518
Rishel  [45] Nov. 22, 1977

[54] FILTER WITH AXIALLY SHIFTABLE ROTATING BACKWASH SELECTOR

[75] Inventor: John W. Rishel, Vicksburg, Mich.

[73] Assignee: Dover Corporation, Portage, Mich.

[21] Appl. No.: 599,956

[22] Filed: July 29, 1975

[51] Int. Cl.² .................................. B01D 29/26
[52] U.S. Cl. .......................... 210/108; 210/107; 210/333 A
[58] Field of Search ............. 210/107, 108, 333 A, 210/340; 277/205

[56] References Cited

U.S. PATENT DOCUMENTS

| 808,922 | 1/1906 | Herrick | 277/205 |
|---|---|---|---|
| 1,919,288 | 7/1933 | Bath | 74/128 |
| 3,169,109 | 2/1965 | Hirs | 210/108 |
| 3,703,465 | 11/1972 | Reece et al. | 210/333 |

FOREIGN PATENT DOCUMENTS

| 2,455,172 | 6/1975 | Germany | 210/108 |

OTHER PUBLICATIONS

Adams' Water Strainer—Bulletin 1901, pp. 36 and 4.

*Primary Examiner*—Tim R. Miles
*Assistant Examiner*—Gregory N. Clements
*Attorney, Agent, or Firm*—Blanchard, Flynn, Thiel, Boutell & Tanis

[57] ABSTRACT

A filter assembly including a housing with a plurality of individual filter units circumferentially arranged within the housing. The housing is compartmented to channel a contaminated fluid to be filtered in a filtering direction through the filter units, from one end thereof to the other. A rotatable, conduit-like backwash arm is disposed in at least one end of the housing for sealed engagement with the contaminated fluid inlet, end of a filter unit and for receiving a backwashing fluid flow therefrom. A rotatable discharge pipe connects to the outlet end of the arm and extends from the housing through a rotary-axial bearing and seal unit thereon, and is coaxially arranged with respect to the circumferential array of filter units. A rotation indexing unit adjacent the housing engages the discharge pipe for angularly shifting said backwash arm from filter unit to filter unit and thereby for backwashing of said filter units in a desired sequence. An axial shift unit engages the discharge pipe for axially shifting the backwash arm away from the filter units preparatory to each angular shift, and for axially shifting the backwash arm into sealed engagement with a new filter unit following such an angular shift. A control coordinates actuation of the rotational indexing unit and axial shift unit for sequentially backwashing filter units of the array. In a modification, a rotatable backwash arm is provided at each end of the array of filter units, movement of the arms being synchronized and the arms being axially opposed for sequentially backwashing the filter unit with a backwashing fluid other than the filtered fluid. In a further modification, the axial shift unit comprises a camming device directly responsive to rotation of the discharge pipe for carrying out the axial shifting of the backwash arm.

11 Claims, 12 Drawing Figures

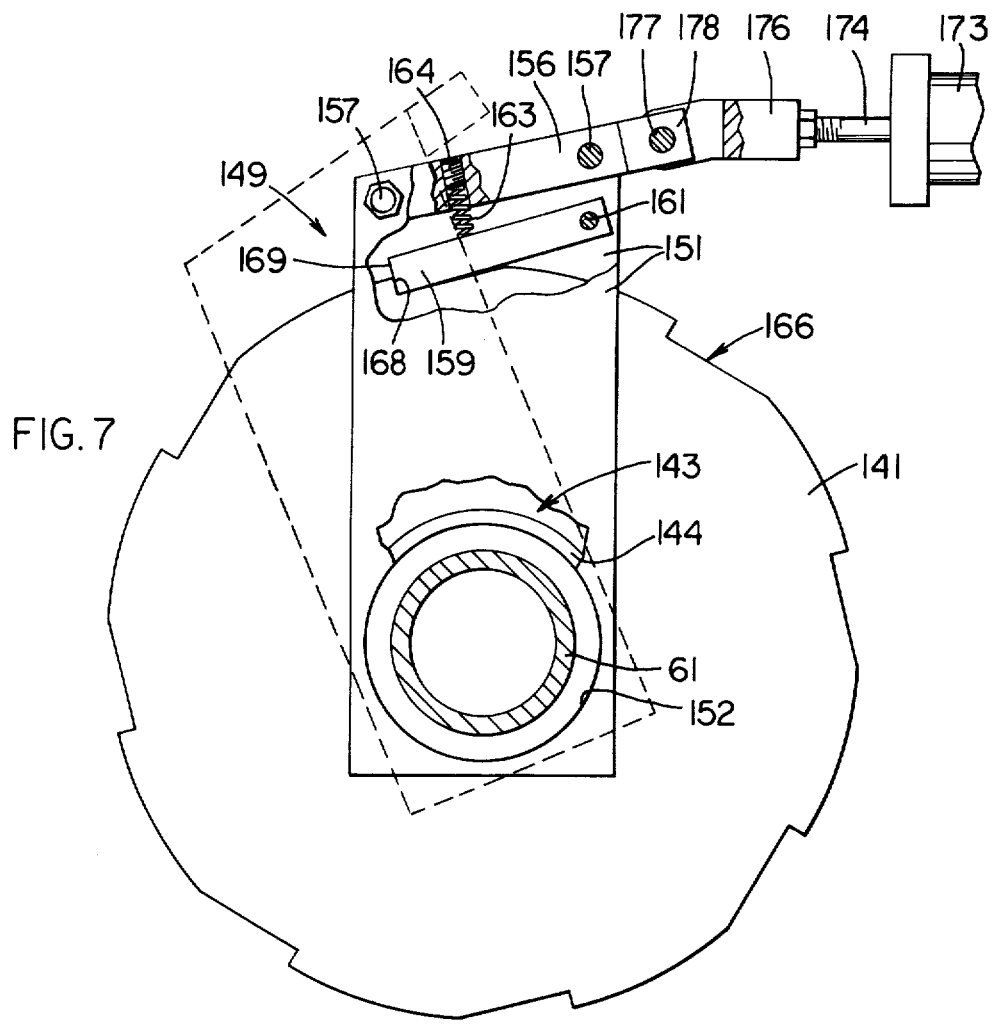
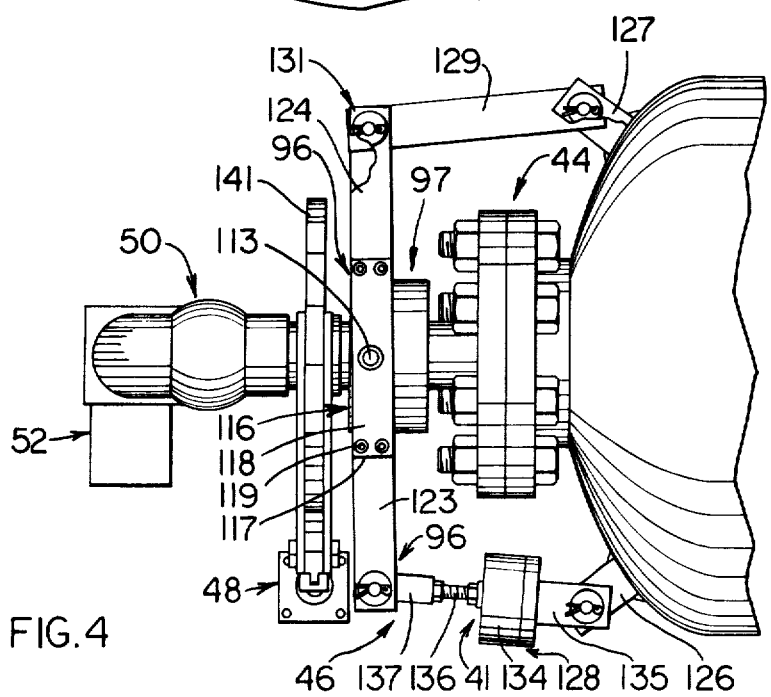

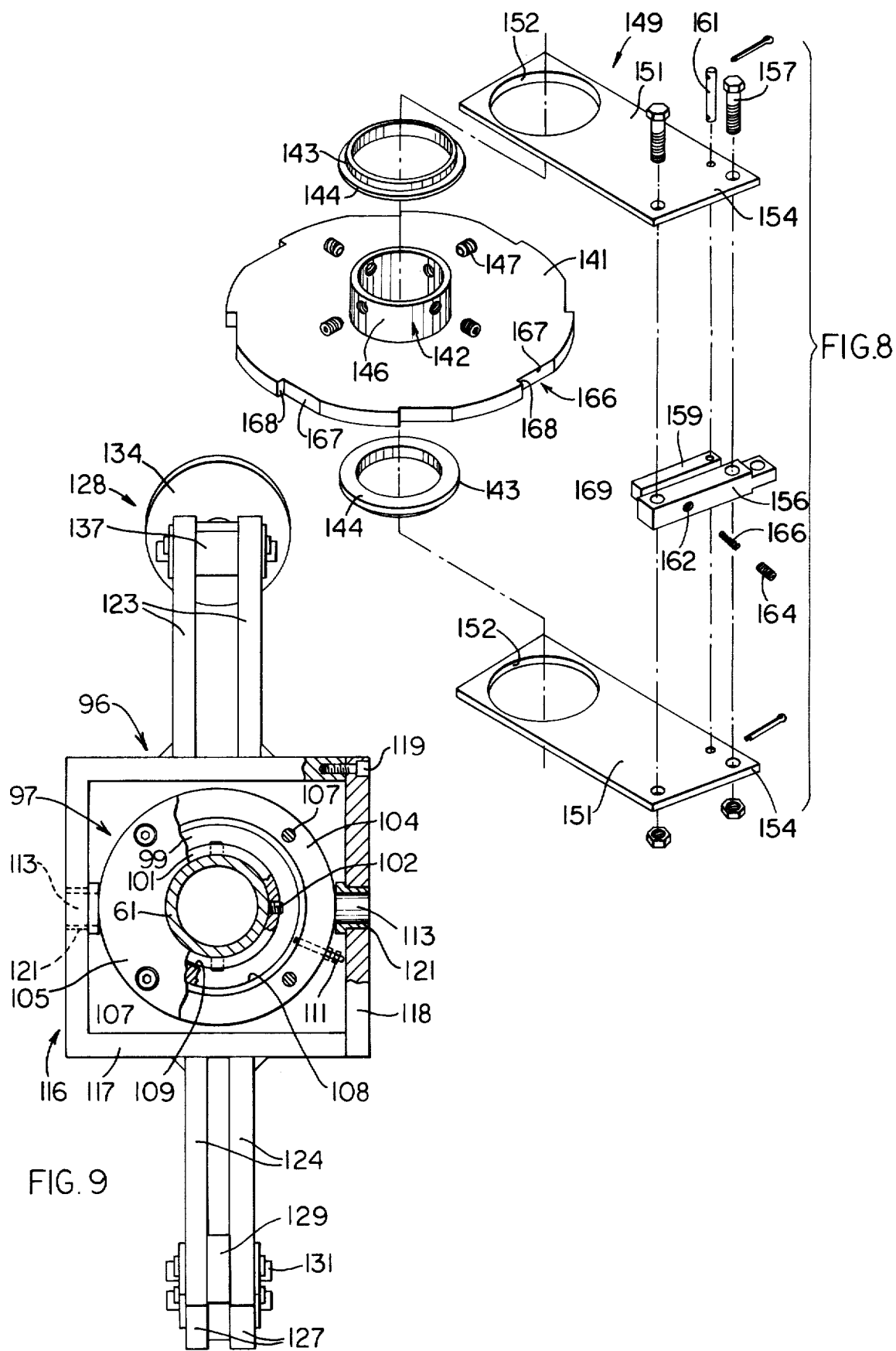

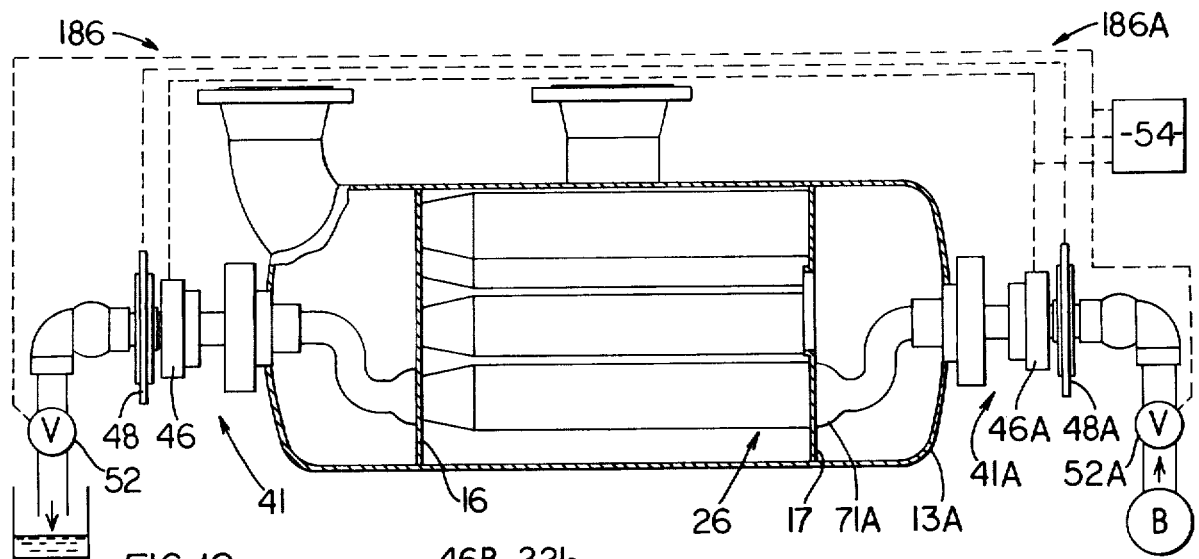
FIG.10
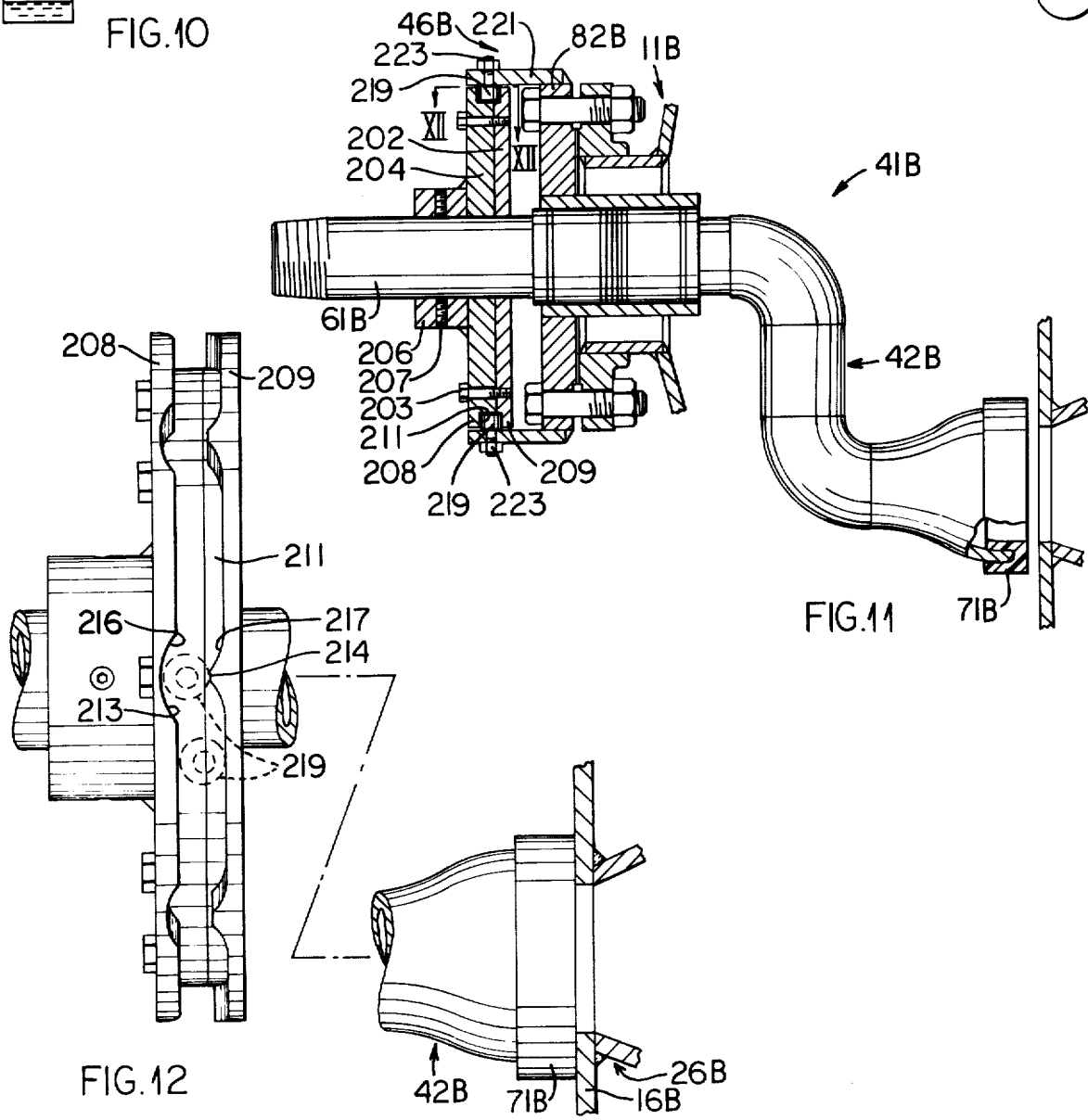
FIG.11
FIG.12

# 4,059,518

FILTER WITH AXIALLY SHIFTABLE ROTATING BACKWASH SELECTOR

FIELD OF THE INVENTION

This invention relates to a filter assembly having a circumferential array of filter units and a rotatable backwash arm for individual backwashing thereof, and particularly relates to such a filter assembly wherein the backwash arm is axially offset from the filter units during its angular shift from filter unit to filter unit.

BACKGROUND OF THE INVENTION

The present invention is directed to an improvement on the invention disclosed in U.S. Pat. No. 3,703,465, assigned to the assignee of the present invention.

In known rotating backwash arm filter assemblies, including that of the above-mentioned patent, wherein the array of filter units and the rotatable backwash arm extend axially from each other, the backwash fluid outlet ends of the filter unit are normally coplanar and communicate through openings in a partition with the portion of the housing in which the backwash arm is located. In such known arrangements, sequential backwashing of the filter units is accomplished solely by rotation of the backwash arm from filter unit to filter unit and the adjacent end portion of the backwash arm is in continuous contact with the opposed face of such partition. In an attempt to maintain a degree of backwash efficiency, the orbiting end of the backwash arm is normally provided with an annular seal engageable with the opposed surface of such partition to limit leakage of fluid flowing between the arm and an opposed filter unit and leakage between arm and partition, and to obtain even minimal sealing, the arm end seal must be axially urged against the partition with substantial force. On the other hand, as the arm angularly indexes from one filter unit to the other, the seal scrubs along the face of the partition. Thus, a rotation drive motor of considerable power and hence size is required to rotate the arm in view of the relatively high starting and running friction between the seal and partition. Further, frictional wear on the opposed faces of the partition and seal, particularly the latter, is relatively rapid, normally requiring relatively frequent seal replacement. Such power and wear considerations appear despite compromising of seal effectiveness due to limiting the force of compressive contact between the seal and partition.

Further, and as a practical matter, the partition in a given production filter assembly may be less than perfectly flat and/or may be somewhat cocked with respect to the arm rotational axis. This tends to promote imperfect sealing and leakage in backwashing of one or more of the array of filter units. Attempts to overcome this problem have included use of very soft flexible arm end seals which tend to wear even more rapidly and may, in use, distort sufficiently to partially block backwash fluid flow between the arm and opposed filter unit. Such attempts have also included use of spring-loaded multi-part seals, which are relatively complex mechanically and relatively expensive and typically involve additional sealing faces internally of the seal itself.

In addition, prior assemblies of this type have typically employed either a manual rotation of the arm or a rotatable motor (e.g. electric) wherein rotational indexing of the arm may be relatively imprecise, due to difficulty in precisely stopping motor rotation with the arm precisely coaxial with the next filter unit to be backwashed. In other prior assemblies the arm rotated continuously, thereby limiting adjustability of backwash time.

Accordingly, the objects of this invention include provision of:

1. A filter assembly having an improved rotating arm backwash system for improving backwash efficiency and reducing backwash fluid leakage.

2. A filter assembly, as aforesaid, which provides for positive sealing of the opposed backwash arm and filter unit end, and permits substantially increased compressive axial sealing forces therebetween for substantially eliminating leakage, while permitting use of an inexpensive one-piece seal of simplified construction.

3. A filter assembly, as aforesaid, which at least substantially eliminates (and in a preferred embodiment eliminates) lateral sliding contact between the arm seal and opposed partition or filter unit end faces during rotational indexing of the arm from one filter unit to the next, which eliminates scuff wear on such opposed sealing faces, and which does so without inducing backwash fluid leakage.

4. A filter apparatus, as aforesaid, which permits substantial increases in acceptable tolerances for partition flatness and coplanarity of filter unit backwash fluid outlet ends and for perpendicularity of the backwash arm rotation axis to such partition or the plane of such filter unit end, without reduction of backwash efficiency or promotion of backwash fluid leakage.

5. A filter assembly, as aforesaid, wherein the backwash arm and its end seal are maintained out of contact with and somewhat spaced from the partition and opposed filter unit ends during at least the major portion (all in a preferred embodiment) of rotation from filter unit to filter unit.

6. A filter unit, as aforesaid, in which positive and precise angular location of the backwash arm, in coaxial relation to each of the filter units is achievable, wherein circumferential offsetting therebetween and consequent cross-sectional restriction of backwash flow is eliminated, and wherein a rotational indexing unit of positive type is employed.

7. A filter unit, as aforesaid, wherein a substantial axial sealing force is achievable with a relatively small, low force motor means wherein a mechanical advantage is provided between such motor means and arm.

8. A filter assembly, as aforesaid, wherein the rotating arm unit is readily adaptable to a variety of previously manufactured filter assemblies, which may be in present use, as well as to inclusion in new filter assemblies during manufacture, and wherein the rotating arm unit is readily adaptable to filter assemblies having filtering units of different size, circumferential spacing, quantity and so forth with minimal and readily carried out substitution of parts.

9. A filter assembly, as aforesaid, wherein the backwash system is rugged and reliable in construction, relatively simple in construction and low in cost, and readily repairable if necessary.

10. A filter assembly, as aforesaid, which substantially eliminates breakage of rotating arm unit parts, particularly should sticks, pieces of metal, or other relatively rigid debris, become lodged in the path of parts of the rotating arm unit and wherein the rotational indexing and axial shift drive for the rotating arm employ force generating means of resilient type.

11. A filter assembly, as aforesaid, which may utilize for backwashing either filtrate or separate backwashing fluid.

Other objects and purposes of this invention will be apparent to persons acquainted with apparatus of this general type upon reading the following specification and inspecting the accompanying drawings.

BRIEF DESCRIPTION OF THE DRAWINGS

FIG. 4 is an enlarged, partially broken fragmentary view of the apparatus of FIG. 1 taken substantially from the top thereof and showing the portion of the rotating arm unit outside the filter housing.

FIG. 7 is a fragmentary, partially broken sectional view substantially as taken on the line VII—VII of FIG. 5 and showing the rotational indexing unit.

FIG. 8 is an exploded pictorial view of the rotational indexing unit of FIG. 7.

FIG. 9 is a section view substantially taken on the line IX—IX of FIG. 5.

FIG. 10 is a somewhat diagrammatic central cross-sectional view of a modified filter assembly employing a rotating arm unit at each end.

FIG. 11 is a view substantially similar to FIG. 5 but showing a modified axial shift unit.

FIG. 12 is an enlarged sectional view taken on the line XII—XII of FIG. 11 and with a cam roller indicated in broken lines for several rotative positions of the rotating arm unit.

Figure 1:
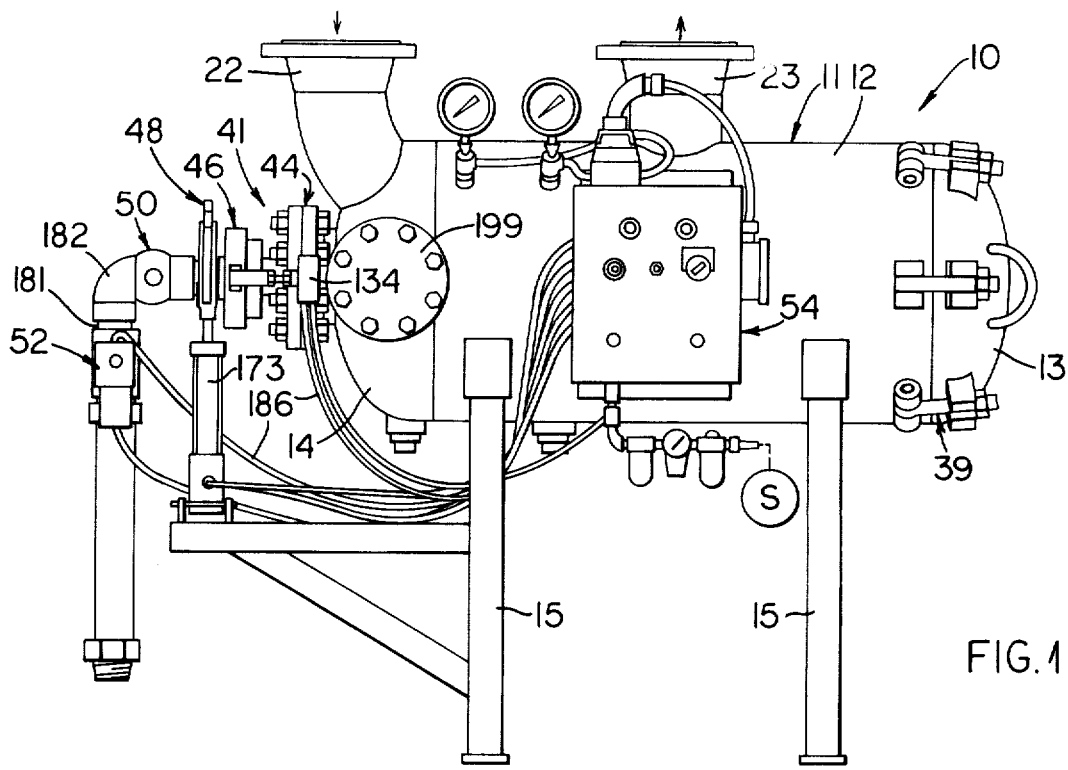
FIG. 1 is a side view of a filter assembly embodying the invention.

Certain terminology will be used in the following description for convenience in reference only and will not be limiting. The words "up" and "down", "right" and "left" will designate directions in the drawings to which reference is made. The words "in" and "out" will refer to directions toward and away from, respectively, the geometric center of the device and designated parts thereof. Such terminology will include derivatives and words of similar import.

SUMMARY OF THE INVENTION

The objects and purposes of the invention are met by providing a filter assembly including a housing and plurality of individual filter units circumferentially arranged in the housing. The housing is compartmented to channel a contaminated fluid to be filtered in a filtering direction through the filter units, from one end thereof to the other. A rotatable, conduit-like backwash arm is disposed in at least one end of the housing for sealed engagement with the contaminated fluid inlet end of a filter unit and for receiving a backwashing fluid flow therefrom. A rotatable discharge pipe connects to the outlet end of the arm and extends from the housing through a rotary-axial bearing and seal unit thereon, and is coaxially arranged with respect to the circumferential array of filter units. A rotation indexing unit adjacent the housing engages the discharge pipe for angularly shifting said backwash arm from filter unit to filter unit and thereby for backwashing of said filter units in a desired sequence. An axial shift unit engages the discharge pipe for axially shifting the backwash arm away from the filter units preparatory to each angular shift, and for axially shifting the backwash arm into sealed engagement with a new filter unit following such an angular shift. A control coordinates actuation of the rotational indexing unit and axial shift unit for sequentially backwashing filter units of the array. In a modification, a rotatable backwash arm is provided at each end of the array of filter units, movement of the arms being synchronized and the arms being axially opposed for sequentially backwashing the filter unit with a backwashing fluid other than the filtered fluid. In a further modification, the axial shift unit comprises a camming device directly responsive to rotation of the discharge pipe for carrying out the axial shifting of the backwash arm.

DETAILED DESCRIPTION

FIG. 1 discloses a filter assembly 10 embodying the present invention. The filter assembly 10 includes a housing 11 with a cylindrical intermediate portion 12 and opposed end portions, or heads, 13 and 14. In the embodiment shown, the housing 11 is horizontally disposed and carried by a frame 15, here comprising a plurality of support legs.

A platelike partition 16 (FIG. 2) is fixed within the housing 11 and divides same axially into opposed internal chambers, or compartments, 18 and 19. An inlet pipe 22 connects to the housing 11 and communicates with the chamber 18 for supplying a suitable contaminated fluid, such as a contaminated liquid, to be filtered. An outlet pipe 23 communicates with the other chamber 19 for discharging filtered fluid, or filtrate, from the housing 11.

Figure 3:
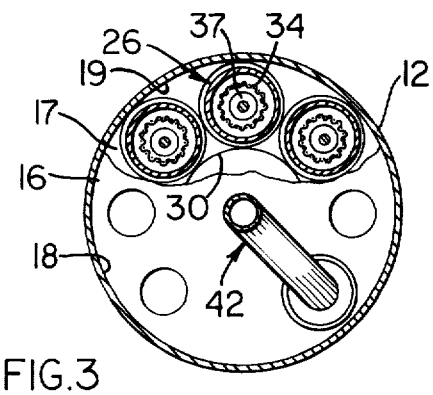
FIG. 3 is a sectional view substantially taken on the line III—III of FIG. 2.

A plurality of separate filter units 26 are circumferentially spaced from each other in a circular array in chamber 19 as indicated in FIG. 3. The filter units 26 are preferably of identical construction. Thus, a given filter unit 26 includes an impervious tubular shell 27 disposed within the outlet chamber 19 and fixed to and extending from the partition 16. In the embodiment shown, a mounting member 17 divides the outlet chamber 19 into central and end portions and fixedly connects the adjacent end of the shell 27 to the peripheral wall of the housing 11. A coaxial mounting ring 32 is fixed, as by welding, coaxially to such end of the shell 27 and here to the mounting member 17 in surrounding relation to a circular opening 33 therethrough. A central opening 30 in the mounting member 17 connects the central and end portions of outlet chamber 19. However, a preferred embodiment omits the mounting member 17 and mutually abuts the rings 32, which preferably are tack welded to each other, to form a rigid array of filter units.

The shell 27 defines a filter chamber 28 therewithin. The remaining open end portion 29 of the shell 27 is substantially conical and is fixed, as by welding, to the partition 16 in coaxial communication with an opening 31 through the partition 16.

The filter unit 26 further includes a cylindrical filter element 34 disposed loosely and coaxially within the shell 27. One end of the filter element 34 is open and is fixedly mounted on the ring 32 for free communication of the interior of the filter element 34 with the end portion of outlet chamber 19. The filter element 34 is preferably a surface type filter media of any desired conventional type, with the mesh size conforming to the desired filtering operation. The remaining end 38 of the filter element 34 is closed, requiring a fluid flow entering one end of the filter unit 26 to pass through the filter element mesh before leaving the other end of such filter unit.

In the embodiment shown, the filter element 34 contains a central, elongated diffuser member 36 carrying a plurality of diffusers 37 to assist uniform distribution of backwash flow axially of the filter element.

The filter elements 34, disposed in the filter chambers 28 bounded by the shells 27, are preferably releasably connected with respect to the rings 32, in a conventional manner, to enable replacement of such filter elements as desired. To this end, release structure, such as the pivoting clamping bolt units at 39, releasably secure the opposed head 13 to the intermediate body portion 12 of the housing 11.

Figure 2:
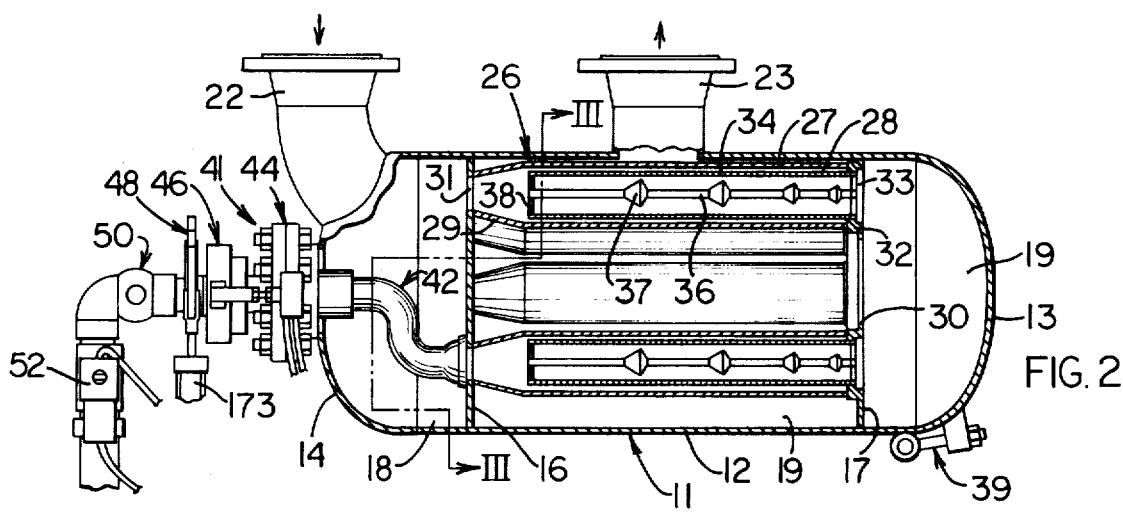
FIG. 2 is a side view similar to FIG. 1 showing the filter housing substantially in central cross section and with portions partially broken.

The apparatus, to the extent above detailed, is substantially similar to that of mentioned U.S. Pat. No. 3,703,465 assigned to the assignee of the present invention. The apparatus disclosed in FIGS. 2 and 3 is also similar to that of the aforementioned U.S. patent in providing a backwash system which incorporates a generally Z-shaped, or cranklike tubular backwash arm, at least at one end of the filter units, as at 42, having an inner end which is rotatable in communication with successive ones of the openings 31 for backwash purposes. As in the aforementioned patent, the filter units are disposed at equally angularly spaced locations on the partition 16 and mounting member 17, except that one such angular location, indicated at 40 in FIG. 3, is left blank. This permits angular location of the backwash arm at such blank location 40, and thus out of communication with any of the filter units 26, at times when no backwashing is required and it is desired to operate all of the filter units 26 for filtering.

Turning now to aspects of the disclosed apparatus more directly embodying the present invention, and not disclosed by the aforementioned patent, FIGS. 1 and 2 disclose a backwash system 41, here for example associated with the head 14 for discharging backwash fluid from the housing 11. The disclosed backwash system 41 comprises a backwash arm unit 42 of particular construction hereinafter described, and a bearing-seal unit 44 by which a portion of the rotating arm unit 42 extends through the head 14. The backwash system 41 further comprises an axial shift unit 46 and a rotational indexing unit 48 both engaging the rotating arm unit for axial shifting and rotational indexing thereof, a rotary joint 50, a flow control valve 52 and a control unit 54 for coordinating and controlling the operation of the axial shift unit 46, rotational indexing unit 48 and valve 52.

Figures 5, 6:
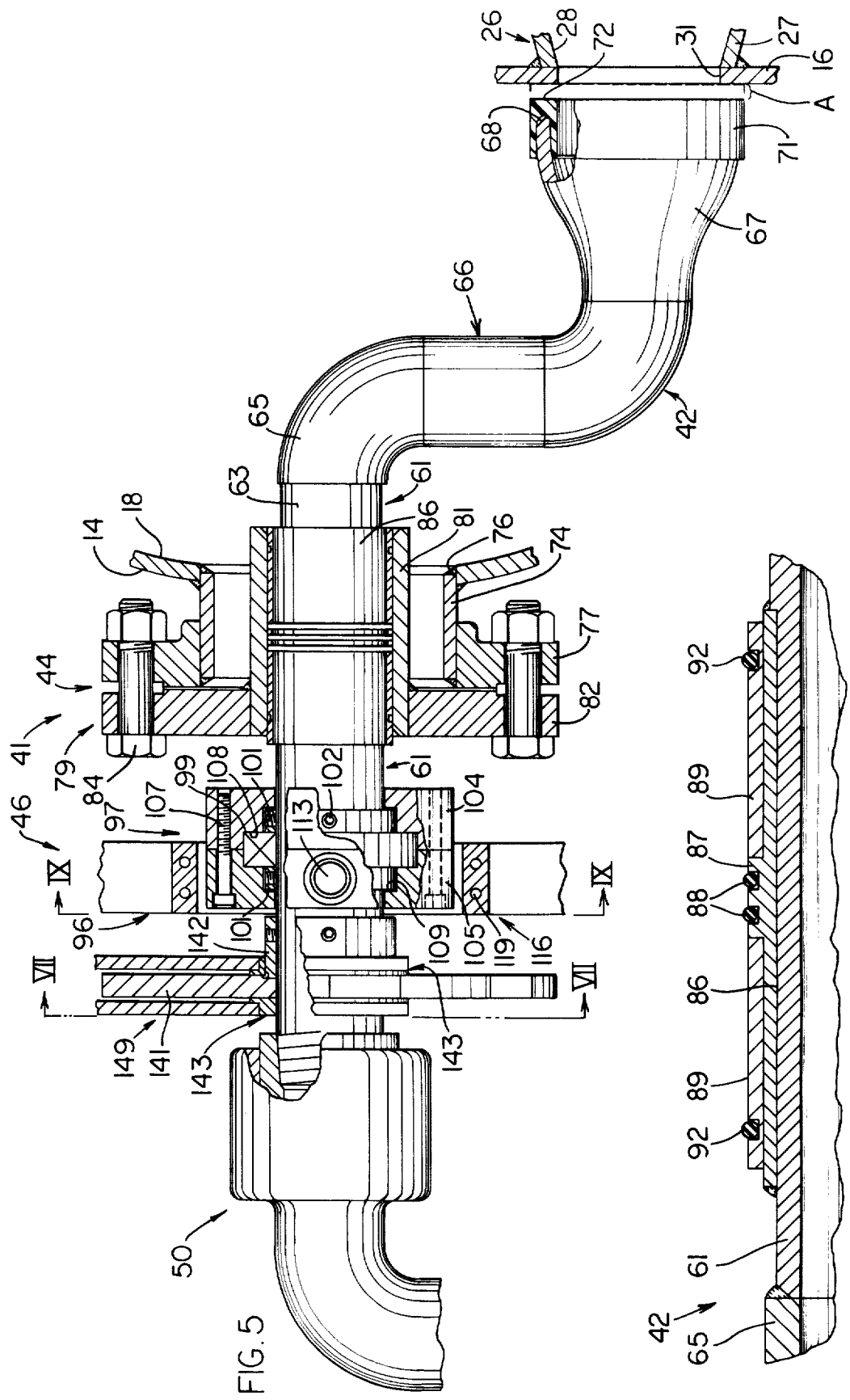
FIG. 5 is an enlarged, fragmentary and partially broken central cross-sectional view of the rotating arm unit, substantially as taken from the top thereof.
FIG. 6 is an enlarged fragment of FIG. 5 showing a portion of the rotating arm bearing.

The backwash arm unit 42 includes an outer conduit, or pipe, 61 (FIG. 5) arranged coaxially of the array of filter units 26 and which extends rotatably and axially slidably through the bearing-seal unit 44. The outer end of the outer conduit 61 extends beyond the housing 11 to the rotation joint 50. The inner end 53 of the conduit 61 extends into the chamber 18 and connects, as by welding (FIG. 6) to the central end 65 of a generally crank-shaped, or Z-shaped, arm conduit 66. The radially outer end 67 of the arm conduit 66 is preferably somewhat bell-shaped as seen in FIG. 5 and is radially offset from the outer conduit 61 for coaxial alignment with each of the filter units 26. The bell-shaped axially inner end 67 of the arm conduit 66 may be provided with a beveled edge, as at 68, and is substantially similar in internal cross section to the opposed opening 31 of the adjacent partition 16.

An annular seal member 71 has a substantially U-shaped cross section conforming to the cross section of the open end of the bell 67 and is fixedly secured thereon by any convenient means, such as friction. The end 72 of the seal ring 71 is preferably relatively flat and defines a plane parallel to the partition 16. With the bell 67 rotated into coaxial alignment with a given filter unit 26, the seal face 72 opposes the portion of partition 16 immediately surrounding the opening 31 and upon inward axial shifting of the rotating arm unit 42 the seal 71 is forcibly brought into firm compressive sealing contact with the opposed annular portion of the partition 16 for a substantially leakproof path between the conical end of the filter chamber 28 and the interior of the arm conduit 66 and hence the connected arm outer conduit 61. The seal ring 71 is preferably of relatively firm elastomeric material so as not to distort into and obstruct the flow path therethrough but yet to provide a leakproof seal when brought into contact with the partition 16. The seal material may be, e.g., urethane, silicone, fluorocarbon rubber, etc.

The bearing-seal unit 44 (FIG. 5) comprises a tubular skirt 74 loosely coaxial with the central portion 63 of the arm unit and fixed, as by welding, to the edge of a central opening 76 in the end of the housing head 14. A fixed annular mounting flange 77 is axially offset from the head 14, snugly surrounds the external end of the skirt 74 and is affixed and sealed thereto as by welding. The internal diameter of the skirt 74 is sufficient to permit removal of the arm unit, upon suitable cocking thereof, from the housing 11.

The bearing-seal unit 44 further includes a releasable backwash arm support 79 comprising a tubular shell 81 loosely and coaxially disposed between central arm conduit 61 and skirt 74, and an annular mounting flange 82 secured, as by welding, to the exterior end of the shell 81. The flanges 77 and 82 are releasably securable in fluid sealing face-to-face contact, preferably by a circumferential array of bolt-and-nut assemblies 84.

The bearing-seal unit 44 further includes a tubular retainer 86 snugly fixed, as by welding, on the central conduit 61 of the arm unit 42 for rotatably and axially slidably supporting the central arm conduit 61 within the shell 81 in bearing and sealing relation therewith. More particularly, the retainer 86 includes a somewhat raised, central portion 87 annularly grooved for receiving a pair of O-ring seals 88 and which is axially flanked by a pair of sleeve bearings 89 fixed thereon for rotatably and axially slidably bearing on the interior surface of the shell 81. The bearings 89 preferably are each externally grooved adjacent their ends for carrying additional O-ring seals 92 which are axially spaced to remain in sealing contact with the interior of shell 81 throughout the axial travel of the arm unit 42. Thus, the bearing-seal unit 44 supports the arm unit 42 for rotation and axial shifting but seals against fluid leakage from the interior of the housing 11 therepast.

The axial shift unit 46 (FIGS. 4, 5 and 9) is axially offset from the housing 11 adjacent the bearing-seal unit 44 and comprises a yoke assembly 96 and a thrust collar assembly 97 in gimballed relation.

The thrust collar assembly 97 (FIGS. 5 and 9) includes a thrust bearing 99 snugly telescoped on the central arm conduit 61 and axially fixed thereon by axially flanking retainer rings 101. Circumferentially distributed set screws 102 (preferably four per ring 101) secure the rings to the conduit 61. The bearing 99 is preferably a conventional low-friction biaxial thrust bearing, e.g. of ball or roller-type, having the usual relatively rotatable radially interior and exterior parts, which here respectively engage the conduit 61 and a flanking pair of collars 104 and 105.

The collars 104 and 105 are annular and loosely surround the conduit 61. Such collars are secured in axial face-to-face contact, preferably by a circumferential array of screws 107 near the periphery thereof. The opposed faces of the collars 104 and 105 are recessed, as at 108, to snugly receive radially, and particularly axially, the outer portion of the thrust bearing therebetween, and are further recessed, as at 109, to loosely receive the respective retaining rings 101. If desired, one of the collars, here collar 104, may be provided with a conventional grease fitting 111 (FIG. 9) angling from its periphery into communication with the corresponding thrust bearing recess 108 for periodically lubricating same and the outer edge of the thrust bearing recess 108 in such collar 104 may be chamfered as shown in FIG. 5 to provide an annular lubricant storage space.

A pair of gimbal pins 113 are fixed as by welding to the collar 105 and extend diametrally therefrom for pivotal engagement with the yoke assembly 96.

The yoke assembly 96 comprises an axially open, circumferentially closed yoke 116 (FIGS. 5 and 9). The yoke 116 is here of square configuration, as seen from its end, and comprises a generally U-shaped peripheral member 117 having legs paralleling the axes of the gimbal pins 113. A barlike peripheral member 118 closes the open side of such U-shape and is removably secured at its ends to the ends of such legs by screws 119. Centrally fixed in the bight or central side of the U-shaped peripheral member 117 and in the removable peripheral bar 118 are diametrally aligned sleeve bearings 121 (FIG. 9) pivotally receiving the gimbal pins 113, the opposed inner ends of the sleeve bearings 121 being flanged to provide thrust bearing surfaces for the opposed peripheral faces of the collar 105. In this way, the yoke is supported concentrically on the collar 105 for relative pivotal movement on the axes of gimbal pins 113.

The yoke assembly 96 further includes diametrally opposed and extending actuating bar pairs fixed as by welding to the legs of yoke member 117 and which are preferably coplanar with the yoke 116. The free ends of the bars 123 and 124 are spaced apart diametrally of the arm conduit and are at least approximately axially spaced from tabs, or the like, 126 and 127 fixed, as by welding, to the housing head 14 in diametrally spaced relation to the bearing-seal unit 44. Links 128 and 129 have ends pivotally connected from tab 126 to the free end of bar pair 123 and from tabs 127 to the free end of bar pair 124. The pivot connections may be as desired, for example pivot pins retained by cotter pins as at 131. One said link is a rigid member and the other, here link 128 shown in the upper portion of FIG. 4, comprises a linear motor 134 pivotally supported at 135 by tab 126 and having an axially extensible, adjustable length, piston rod 136 pivotally secured by an extension bar 137 to the free end of yoke actuating rod 123. In the preferred embodiment shown, the linear motor 134 is a short length pressure fluid cylinder (preferably a double-acting air cylinder).

The axial shift connection of the air cylinder 134 to the gimbal pin 113, and hence to the rotating arm unit 42, provides, in the embodiment shown, about a 2 to 1 mechanical advantage, such that a three-quarter inch shift by the cylinder 134 provides about a three-eighth inch axial shift of the arm unit 42. In view of such mechanical advantage, the size of the cylinder 134 can be about half that which would be otherwise required to apply a given axial sealing force of the arm seal 71 (FIG. 5) against the partition 16.

The rotational indexing unit 48 (FIGS. 4, 5, 7 and 8) comprises a platelike ratchet disk 141 end abutting and fixed as by welding to a tubular hub 142 (FIGS. 5 and 8) L-cross-section bearing rings 143 snugly flank the disk 141 with one on the hub 142. One end of the hub 142 extends, at 146, beyond the last-mentioned bearing ring 143 and is secured to the arm conduit 61 by circumferentially disposed set screws 147 (here four in number). The disk and hub assembly 141, 142 is thus radially snugly secured on the conduit 61, against both axial and rotational motion with respect thereto. A ratchet assembly 149 includes a pair of substantially rectangular plates 151 which sandwich therebetween the disk 141, annular flanges 144 on the bearing rings 143 spacing the plates 151 from the disk 141 and providing an axial thrust bearing surface between the plates and disk. Coaxial openings 152 at the radially inner ends of the plates 151 snugly receive the axial portion of the bearing rings 143 therein for supporting the plates 151 for pivotal movement on, and with respect to, the hub 142. The plates 151 extend radially beyond the periphery of the disk 141 to free ends 154 which are fixedly secured together by an intervening end support bar 156 and through bolt assemblies 157, which rigidly fix the plates 151 in parallel relation and maintain the bearing ring flanges 144 snugly between the plates 151 and disk 141.

A barlike pawl 159 is close spaced inboard of the bar 156 and is pivotally supported adjacent one end on the flanking plates 151, as by a through-pin 161 axially retained, as by cotters. An opening 162 through the support bar 156 receives a coil compression spring 163 backed by a set screw 164 threaded therein, wherein the spring 163 bears on the opposed face of the pawl 159 to urge same against the periphery of disk 141.

The substantially circular periphery of the disk 141 is provided with a series of asymmetric notches 166 corresponding in angular spacing to the angular spacing of the filter units 26 and blank location 40. Each notch 166 includes an elongate somewhat tangential ramp 167 adapted to face the side of the pawl 159 and terminating at a short substantially radial abutment face 168 engageable by the free end 169 of the pawl.

A ratchet drive assembly 171 (FIGS. 1 and 7) includes a linear motor (preferably a double-acting air cylinder of elongate stroke) indicated at 173, and fixedly mounted with respect to the frame 15. The piston rod 174 (FIG. 7) of the cylinder 173 axially adjustably mounts a clevice 176 pivotally engaged, as by pin 177, with an extension 178 of the ratchet plate support bar 156. Thus, with the free end of the pawl 159 engaging the abutment face 168 of a notch on disk 141, extension of the linear motor 173 angularly rotates the disk 141 and hence arm unit 142 a distance corresponding to the angular spacing of the filter units 26 and blank location 40.

The rotational joint 50 is of conventional type requiring no detailed description and rotatably secures, in fluid transmitting relation, the free end of arm conduit 61 to a further, and normally fixed, pipe or conduit 181 (FIG. 1) which is here provided with an elbow 182 and leads away from the housing 11. Intervening in the conduit 181, preferably adjacent the rotational joint 50, is the on-off valve 52. The valve 52 preferably employs the same control medium as do cylinders 173 and 134, and hence is preferably an air-controlled valve, for example of double-acting type.

The control 54 comprises timing means of any conventional type capable of actuating the cylinders 134 and 173 and valve 52 in the sequence discussed below and by applying and withdrawing air pressure through conventional valving of air lines generally indicated at 186 leading thereto, upon connection to a conventional pressurized air supply S (FIG. 1). Timing controls for multiple double or single-acting fluid actuated devices have long been known and the present invention is not concerned with the particular character or detail of such control. Hence, a detailed disclosure of such control is not believed required. A suitable control is purchasable from the present assignee under Model No. CS 40301 DGM.

If desired, an access opening, normally closed by a removable access plate 189 may be provided in the side of the head 14 to permit inspection of the interior, particularly of the seal ring 71, without removal and/or disassembly of the rotating arm system, and/or to facilitate replacement of the seal 71 without need to remove the rotating arm conduit 66 from within the housing 11.

OPERATION

While the operation of the apparatus of FIGS. 1-9 has been indicated above, same will be now summarized for a clearer understanding of the invention.

With the apparatus arranged as above described, normal filtering operation, wherein no backwash is required, proceeds as follows. The valve 52 is closed, the rotational indexing unit has positioned the arm unit 42 in opposed relation to the blank location 40 on partition 16 and the axial shift unit is positioned to space the seal 71 away from such blank portion of the partition 16. A contaminated fluid to be filtered, entering the inlet 22 under pressure, passes through chamber 18 and openings 31 into the filter chambers 28, and flows thence radially inward through the filter media of filter element 34, through the openings 33 at the open ends of the filter elements and into the end portion of housing chamber 19 as filtered fluid. The filtered fluid then flows axially back (here through the central opening 30 of mounting member 17) contacting the outsides of the impervious filter shells 27 and then passes out of the central portion of housing chamber 19 through the filtrate outlet 23. The fluid pressure in chamber 19 is less than in chamber 18, due to a pressure drop across the filter media, but is greater than the pressure (e.g. atmospheric) toward which conduit 23 opens.

The embodiment disclosed in FIG. 2 employs only a single rotary arm backwash system which, by disposition in the chamber 18 is arranged to discharge backwash fluid, carrying the material removed from the outsides of the filter elements during backwashing, from the housing 11, and employs the filter fluid, or filtrate, as the backwashing liquid.

After the apparatus has operated in its filtering mode above described for a period of time, solids tend to build up on the media mesh of the filter elements 34 and it is necessary to periodically initiate a backwashing sequence. This can be done manually or, preferably, through conventional means responsive to the pressure differential between chambers 18 and 19 and which may be included in control 54. In the backwashing sequence employed in the embodiment shown, the filter elements 34 are backwashed one at a time and as each filter element is being backwashed, the remaining plurality of filter elements continue to operate in their filtration mode, removing contaminant solids from the fluid to be filtered. Thus, such filter assembly can continuously filter fluid flow over an indefinite time, despite periodic backwash sequences occurring within that time.

A given one of these periodic backwash sequences comprises a series of identical backwash cycles, one for each filter element, and a further cycle involving the location of a backwash arm seal 71 in spaced opposed relation to the blank location 40, whereat no filter element is present.

Broadly speaking, the initial cycle involves rotating the backwash arm unit 42 from its location spaced opposite blank location 40 through a preselected angle into coaxial alignment with the adjacent filter unit and axially shifting same toward the partition 16 to forcibly and sealingly engage the annular seal 71 with the face of the partition 16 in coaxial alignment with the corresponding opening 31. On the last cycle of the sequence, of course, the seal 71 is returned to spaced opposition with the blank location 40 on the partition 16. While it is contemplated that the rotational indexing unit 48 for the circumferential arrangement of filter units 26 may be such that the arm unit 42 skips some filter units in a given rotation or has some other rotative pattern, the preferred embodiment shown provides for rotation of the arm 42 in one rotational direction and for sequential engagement thereof with angularly adjacent filter units, which simplifies the rotational indexing unit.

For the sake of example, a typical backwash cycle, intermediate in the backwash sequence, may proceed as follows, either by manual actuation of the air line 186 or, preferably, by automatic actuation preprogrammed into the timing control 54.

Prior to starting such intermediate cycle, the arm unit 42 is in its inner position with its seal 71 pressed against the partition 16 coaxially of a given filter unit 26, and cylinder 134 thus in its retracted state. The valve 52 is open for receiving backwash flow from the arm unit 42 and opposed filter unit 26. Note, however, that at times outside the backwash sequence, the valve 52 would normally be closed such that fluid flow through the backwash arm unit 42 is precluded by such closed valve 52.

Such intermediate cycle initiates upon the occurrence of several substantially simultaneous events. More particularly, at the start of the cycle the valve 52 closes. Also, the axial shift cylinder 134 extends. This pushes the actuator bar pair 123 (FIG. 4) away from the housing 11 and correspondingly pivots the yoke 116 and gimbal pins 113 away from the housing 11. The collars 104 and 105, thrust bearing 99, and, through retainers 101, the arm central conduit 61 thus axially shift away from the housing 11. The arm seal 71 thus shifts from its broken line engaged position of FIG. 5 to its solid line, disengaged position wherein it is spaced from the partition 16 by a small distance A, such as three-eighth inch. This separation distance A is sufficient as to more than compensate for nonplanarity or/and cocking of the partition 16 with respect to the axis of the central arm conduit 61 such that the seal 71 cannot scrubbingly contact the partition 16 regardless of its rotational position.

The next step in such intermediate cycle involves rotating the arm unit 42 into coaxiality with the next filter unit 26. Prior to this step, however, the cylinder 173 retracts, returning the pawl 159 (FIG. 7) in a clockwise direction (as seen looking toward the housing 11 from the rotational joint 50). The retraction of cylinder 173 is sufficient that the free end 169 of the pawl rides entirely off the ramp 167, across the adjacent peripheral portion of the disk 141 and falls with a clearance into the next notch 166 in such disk, wherein the free end 159 of the pawl is in close but spaced relation to the actuating face 168 in such next notch. During this retraction, the disk 141, and hence the arm unit 42, does not move angularly.

To accomplish the rotation step, the cylinder 173 (being in its retracted position) is actuated to extend. This advances the pawl 159 leftwardly in FIG. 7, pushing its end 169 against the opposed disk abutment face 168 and advances the disk counterclockwise (FIG. 7) through an angle equal to the angle between adjacent filter units 26, to thereby pivot the arm unit 42 (FIG. 3) counterclockwise into coaxial alignment with the next filter unit 26. During this angular advancement, the arm and seal 71 remain spaced from the partition 16 and substantially by the dimension A shown in FIG. 5.

A brief time is allowed for this angular advancement and after its completion, the control 54 energizes the axial shift cylinder 134 (FIG. 4) to retract same and through yoke assembly 116 and thrust collar assembly 97 shifts the arm unit 42 toward the partition 16, bringing the arm seal 71 forcibly and sealingly into contact therewith and in coaxial alignment with the adjacent opening 31 and filter unit 26. The force of the cylinder 134 is multiplied by the mechanical advantage of the yoke assembly 116 such that the seal 71 is urged against the partition 16 with a multiple of the force resiliently engendered by air pressure in the cylinder 134. The seal 71 has sufficient resilience to accommodate at least the maximum tolerance deviations of the partition 16 from nonplanarity to the rotational axis of the arm unit 42, assuring a tight seal between annular seal 71 and partition 16. The arm unit 42 is now positioned for backwash flow as hereinafter described.

The time allotted from the start of the cycle for the above-described movement of the backwash arm unit 42 may be, as desired, for example five seconds. From the time the backwash arm unit 42 is shifted rotatably from an initial filter unit 26, same can resume normal filtering flow. Similarly, a new filter unit 26 to be engaged by the arm unit 42 can continue filtering flow until the seal 71 is axially advanced to seal the connection between such new filter unit 26 and the arm unit 42, as last described. Since both cylinders 134 and 173 are fluid actuated, preferably by air pressure, and hence resiliently, positive blocking or movement of the arm unit 42 by unexpected presence of a foreign object, such as a stick or metal bar in its path, simply brings such motion to a halt without damaging parts of the backwash system. Thus, upon removal of such obstruction, normal operation can immediately resume.

Since the mentioned retraction of axial shift cylinder 134 is substantially instantaneous, the control 54 can actuate the valve 52 simultaneously therewith. The backwash flow portion of the cycle thus begins and continues for an adjustable time, as 0 to 45 seconds, during which time the remaining filter units continue their filtration mode.

In the present embodiment, backwash flow through the new filter unit 26 is as follows. Here, the backwash fluid is a portion of the filtrate flowing from the remaining filter units into the end cap 13 (FIG. 2). Such portion enters the open end of the filter element 34 of such new filter unit being backwashed, and flows radially outwardly through the filter element mesh to dislodge accumulated solids therefrom. A uniform distribution of backwash flow longitudinally of the filter element is enhanced by the diffuser unit 36, 37 in the disclosed embodiment. The backwash fluid with removed solids mixed therein flows out the conical end 29 of filter shell 27, through the Z-shaped conduit 66 and central conduit 61 of the arm unit 42, thence through the rotational coupling 50 and open valve 52 to a desired point of discharge, not shown.

Termination of the backwash flow portion of the cycle terminates the cycle and starts a new backwash cycle wherein the backwash arm unit 42 is shifted to the next filter unit whereat backwashing occurs. This cycling continues under control of timing control 54 until all filter units have been backwashed and the arm unit 24 resumes its idle position opposed to the blank portion 40 of the partition 16.

Since the seal 71 moves only axially during its engagement of and disengagement from the partition 16, sliding or scuffing contact therebetween is eliminated and frictional wear on the seal 71 becomes substantially negligible. At the same time, the construction of the seal 71 may be optimized for sealing so as to substantially eliminate leakage between the backwash filter unit 26 and arm unit 42 thereby maximizing backwashing efficiency. To the same end, and by appropriate adjustment of the effective length of piston rod 136, the seal 71, despite warpage or cocking of partition 16, is always out of contact therewith during rotation and also is axially advanced into full forcible sealing contact with the partition 16 before the end of the extension stroke of cylinder 134 is reached.

Accurate rotational indexing, to assure coaxiality of the backwash arm 42 and filter unit 26 during backwashing, is assured, during set-up of the apparatus, by the angular adjustment of disk 141 with respect to arm conduit 51 afforded by the set screws 147 (FIG. 8) and by adjustment of the effective length of piston rod 174 (FIG. 7) to end its extension stroke with the arm unit 42 and new filter unit 26 coaxially aligned. The stroke length of cylinder 173 effectively somewhat exceeds the tooth pitch on disk 141 to assure proper engagement of the pawl 159 with a new abutment face 168 in each retraction of the cylinder 173.

The backwash system above described is readily adapted to filter assemblies having a different number and/or angular spacing of filter unit by substitution of a new disk 141 having a corresponding spacing and number of notches, and, where necessary, adjustment of the stroke length of cylinder 173. Correspondingly, the system is readily adaptable to filter assemblies having filter units disposed on a larger or smaller radius by substitution of a backwash arm of corresponding radius.

MODIFICATION

FIG. 10 diagrammatically discloses apparatus similar to that above described but modified for use of a separate backwash fluid (rather than the filtrate) substantially in the manner disclosed in aforementioned U.S.

Pat. No. 3,703,465. Such is accomplished by providing a second backwash system 41A associated with the other end 13 wherein the arm seal 71A is engageable with the filter units 26 for applying backwash fluid to the adjacent open end of each filter element in succession. At the same time the backwash system 41 above described is positioned to receive backwash fluid from the same filter unit. The direction of rotational indexing is, of course, reversed by mirror imaging of the parts arrangement in the rotational indexing unit 48A and the components of the indexing units 48 and 48A are axially aligned such that the arm units 42 and 42A maintain coaxiality and engage common filter units 26 throughout each backwash sequence. Such synchronization of the outlet and inlet backwash systems 41 and 41A is further provided by control of both systems from the common timing control 54 by paralleling the set of air lines 186 with a corresponding set of air lines 186A for the inlet backwash system 41A so as to control the units 46A, 48A and 52A thereof for simultaneous operation with corresponding units 46, 48 and 52 of above described outlet backwash system 41. Moreover, the valve 52A will normally be connected to a suitable source B of separate backwash fluid under pressure. Except as above discussed, the inlet backwash system 41A is thus preferably identical to the outlet backwash system 41 above described in detail, as to both structure and operation.

FURTHER MODIFICATION

FIGS. 11 and 12 disclose a portion of a modified backwash system 41B embodying a modified axial shift mechanism 46B. The system 41B may be similar to above described system 41 except as hereafter noted. Parts of the system 41B similar to corresponding parts of above described system 41 carry the same reference numerals with the suffix "B" added.

The modified axial shift unit 46B comprises a coaxial pair of annular disks 201 and 202 removably secured in face-to-face axial contact as by a plurality of circumferentially spaced screws 203. A central hub 206 is fixed, as by welding, to the exposed face of the disk 201 and is fixed on the central arm conduit 61B by a plurality of circumferentially distributed set screws 206 (here four) to fixedly and coaxially locate the disks on such arm conduit with the inner disk 202 close spaced from the bearing-seal unit removable flange 82B.

The disks 201 and 202 have respective, preferably integral, flanges 208 and 209 extending radially therefrom and preferably closely approaching the diameter of the flange 82B. The flanges 208 and 209 are axially spaced from each other by an annular groove 211. The opposed faces of the flanges 208 and 208 are respectively provided with preferably integral and axially opposed cam notches 213 and cam knobs 214 arranged in corresponding circumferential arrays. The cam notches and knobs have inclined, axially opposed, and corresponding ramps 216 and 217 on each circumferential side thereof, the ramp pair for each notch or knob meeting at the center of the corresponding notch or knob to define a radial line of maximum offset from the substantially planar radial surface of the corresponding flange between such notches or knobs. The opposed faces of the flanges 208 and 209 have a substantial constant axial spacing, both at and between the camming portion 213, 214, with the ramps 216 and 217 being curvilinearly contoured and axially spaced in such manner as to accommodate a camming roller therebetween in snugly rollable relation thereto and with a substantially constant axial clearance.

At least a pair, and if desired four, evenly circumferentially spaced rollers 219 are disposed in the groove 211. A fixed skirt 221 (FIG. 11) is secured, preferably by welding, to the periphery of the removable flange 82B of the seal-bearing unit and extends therefrom in coaxial, telescoped clearance relation over the periphery of the disk pair 201, 202. Evenly circumferentially distributed means, here through bolts 223, extend radially inward from the skirt 221 to rotatably support the rollers 219 in the groove 211 of the disk pair 201, 202.

In the embodiment shown, the angular spacing and number of notch-knob sets 213, 214 corresponds in angular spacing to the number of filter units (plus blank location 40) shown in FIG. 3, here equal to eight. The hub 206 is circumferentially positioned on the arm conduit 61A such that the rollers 219 are circumferentially centered on corresponding cam systems 213, 214 when the arm seal 71B (FIG. 12) is coaxial with a given filter unit 26B (or the blank portion 40). In this condition, the rollers 219, which are axially fixed with respect to a housing 11B having ridden one of the ramps 217 to the central portion of the cam knob 214, have thereby axially shifted the arm unit 24B from its retracted, FIG. 11, position to its FIG. 12 location whereat the seal 71B forcibly bears against the partition 16B at such filter unit 26B to establish a backwash in connection therebetween. On the other hand, with the rollers 219 positioned between camming systems 213, 214, such that the arm unit 24B is positioned between filter units 26B, the arm unit 42B and its seal 71B are axially displaced away from the partition 16 as in FIG. 11.

While the cam-type axial shift unit 46B of FIGS. 11 and 12 holds the arm seals 71B out of scrubbing contact with the partition 16 during the majority of rotative travel thereof, the system is less advantageous than that dislosed in FIGS. 1–10 in that for operative interaction between the rollers 219 and camming system 213, 214, axial engagement and disengagement of the seal 71B with the partition 16B is necessarily accompanied at least by a small degree of rotative motion. At least then some degree of seal scrub and wear, and the possibility of some seal distortion, accompanies engagement and disengagement of the seal 71B with the partition 16B. This may also tend to increase somewhat the driving force required to rotate the arm unit 42B. Further, the possible numerical and circumferential relationships between the rollers 219, cam sets 213, 214 and circumferentially distributed backwash stations for the arm 42B may substantially complicate the construction of the axial shift unit 46B where unusual numbers of rotative arm unit positions are required, e.g. five, seven, thirteen, etc. More generally, the distribution of cam systems 213, 214 and rollers 219 must necessarily be in preselected relation to the number of positions of the arm unit 42B and, where used, the rotational indexing disk 141 (FIGS. 1–9), whereas the axial shift unit 46 above described has a construction independent of the number of and spacing of circumferential positions to be assumed.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A filter assembly for removing contaminants from a fluid, comprising:

closed, hollow housing means;

a plurality of individual filter units circumferentially arranged in said housing means;

means compartmenting said housing means for channeling a contaminated fluid to be filtered in a filtering direction through said filter units from one end of each thereof and for receiving filtered fluid from the other ends of said filter units;

a rotatable backwash arm means in at least one end of said housing means and engageable with said one end of a given said filter unit for backwash fluid flow communication therewith, said rotatable backwash arm means including an arm conduit within said housing means and having a central extension passing from said housing means in sealed and rotatably and axially movable relation therewith, said one ends of said filter units lying substantially in a plane, the rotational axis of said backwash arm means being substantially perpendicular to said plane and coaxial with the circumferential array of filter units, said array of filter units and said backwash arm means being confined to zones on opposite sides of said plane;

means engaging said backwash arm means and actuable for rotatably indexing said backwash arm means from filter unit to filter unit while simultaneously axially offsetting said backwash arm means away from said plane of said filter unit one ends during rotative movement of the backwash arm means, thereby to prevent scrubbing contact therebetween;

diametrically spaced pivot means on said one housing end, said means for axially offsetting said backwash arm means comprising collar means surrounding said arm conduit extension, bearing means coaxially locating said collar means with respect to said arm conduit extension and permitting rotation of said arm conduit extension therewith, annular means axially fixing said bearing means with respect to said arm conduit extension, yoke means adjacent said collar means and diametrically gimballed with respect thereto, said yoke means including mechanical advantage means pivotally coupled to said diametrically spaced pivot means and including a resilient motor means interposed therein and actuable for substantially axially reciprocating said collar means and hence said backwash arm means.

2. The filter assembly of claim 1 in which said bearing means comprises a low friction bearing on said arm conduit extension, said annular means comprising a retaining rings flanking said bearing and releasably fixed to said arm conduit extension, said collar means comprising a pair of collars having opposed recess portions for receiving said retaining rings and snugly receiving said bearing therebetween and means releasably axially securing said collars in axially facing contact to coaxially grip said bearing, diametrically opposed gimbal pins pivotally interengaging one said collar with said yoke means, said yoke means comprising a peripherally closed yoke loosely surrounding said one collar and having opposed walls engaged by said gimbal pins for permitting pivoting of said yoke in a diametrical plane of said arm conduit extension.

3. The filter assembly of claim 1 in which said yoke means includes a yoke pivoted on diametrally opposed gimbal pins and in which said mechanical advantage means comprises arms rigidly fixed to opposite sides of said yoke orthoganally of said gimbal pins and having free ends spaced from said yoke axially outward of said pivot means, links pivotally interconnecting said pivot means and arm free ends, one said link including a pressure fluid cylinder defining said last-mentioned resilient motor means such that a relatively long stroke of said pressure fluid cylinder results in a relatively short axial stroke of said collar means and arm conduit extension and, correspondingly, such that a relatively small axial pressure fluid force results in a substantially larger axial force applied to said backwash arm means.

4. A filter assembly for removing contaminants from a fluid, comprising:

closed, hollow housing means;

a plurality of individual filter units circumferentially arranged in said housing means;

means compartmenting said housing means for channeling a contaminated fluid to be filtered in a filtering direction through said filter units from one end of each thereof and for receiving filtered fluid from the other ends of said filter units;

a rotatable backwash arm means in at least one end of said housing means and engageable with said one end of a given said filter unit for backwash fluid flow communication therewith, said rotatable backwash arm means including a crank-shaped arm conduit within said housing means and having a central extension passing from said housing means in sealed and rotatably and axially movable relation therewith, said one ends of said filter units lying substantially in a plane, the rotational axis of said backwash arm means being substantially perpendicular to said plane and coaxial with the circumferential array of filter units, said array of filter units and said backwash arm means being confined to zones on opposite sides of said plane;

means engaging said backwash arm means and actuable for rotatably indexing said backwash arm means from filter unit to filter unit while simultaneously axially offsetting said backwash arm means away from said plane of said filter unit one ends during rotative movement of the backwash arm means, thereby to prevent scrubbing contact therebetween;

bearing seal means fixed on said housing and through which said arm conduit extension rotatably and axially shiftably exits said housing means, said bearing seal means including a radial flange adjacent said housing, said means for axially offsetting said backwash arm means comprising a support member fixed to and extending axially from said flange, a pair of disks secured coaxially on said arm conduit extension axially and radially within said support member, said disks being releasably fixed together in face-to-face contacting relation, said disks having perimetral flanges axially spaced to form a circumferential groove therebetween, said perimetral flanges respectively having ramped cam notches and cam knobs in axially spaced and opposed pairs, at least one pair of diametrically opposed rollers extending radially inward from said support member into said groove, said rollers being rotatably supported by said support member on their own length axes but otherwise fixedly located with respect to said housing means, said rollers being rotatably engageable with the opposed faces of said flanges at and between said cam notch-cam knob pairs, said notch-knob pairs being circumferentially arranged on said disks in a circumferential distribution corresponding to that of said filter units, such that rotation of said disks with said arm conduit extension axially urges the interior end of said crank-shaped arm conduit into sealing relation with an opposed filter unit one end but axially shifts said crank-shaped arm conduit away from the plane of said filter unit one ends upon rotation out of said coaxial alignment.

5. A filter assembly for removing contaminants from a fluid, comprising:
   closed, hollow housing means;
   a plurality of individual filter units circumferentially arranged in said housing means;
   means compartmenting said housing means for channeling a contaminated fluid to be filtered in a filtering direction through said filter units from one end of each thereof and for receiving filtered fluid from the other ends of said filter units, said one ends of said filter units lying substantially in a plane;
   a rotatable backwash arm means in at least one end of said housing means and rotatable into engagement with the said one ends of successive said filter units for backwash fluid flow communication therewith, said rotatable backwash arm means comprising a crank-shaped conduit having a central extension extending from said one end of said housing means in sealed and rotatably and axially movable relation therewith, the rotational axis of said backwash arm means being substantially perpendicular to said plane and coaxial with the circumferential array of filter units, said array of filter units and said backwash arm means being confined to zones on opposite sides of said plane;
   rotational indexing means engaging said backwash arm means and actuable for angularly shifting said backwash arm means from axial alignment with one filter unit to axial alignment with another, said rotational indexing means comprising a disk having an annular hub angularly adjustably fixed on said arm conduit extension and a periphery carrying circumferentially arranged notches in one-to-one angular correspondence with said filter units, a pawl support pivoted on said arm conduit extension and extending radially out along said disk, a push bar pivoted adjacent one end on said pawl support and resiliently biased toward said disk and lying substantially tangential of said disk, and a pressure fluid cylinder acting between said housing means and pawl support, said pawl support comprising a pair of radially extending plates spaced from and flanking said disk, an end support bar fixedly sandwiched between the free ends of said plates immediately outboard of and substantially paralleling said push bar, and adjustable spring means on said end support bar extending toward and urging said push bar sideways into a said disk notch;
   axial shift means engaging said backwash arm means extension and actuable for axially disengaging and engaging said backwash arm means with said one end of said filter units, such that the backwash arm means is axially offset out of contact with said filter units during at least a portion of the rotational indexing thereof.

6. A filter assembly for removing contaminants from a fluid, comprising:
   closed, hollow housing means;
   a plurality of individual filter units circumferentially arranged in said housing means;
   means compartmenting said housing means for channeling a contaminated fluid to be filtered in a filtering direction through said filter units from one end of each thereof and for receiving filtered fluid from the other ends of said filter units, said one ends of said filter units lying substantially in a plane;
   a rotatable backwash arm means in at least one end of said housing means and rotatable into engagement with the said one ends of successive said filter units for backwash fluid flow communication therewith, said rotatable backwash arm means comprising a crank-shaped conduit having a central extension extending from said one end of said housing means in sealed and rotatably and axially movable relation therewith, the rotational axis of said backwash arm means being substantially perpendicular to said plane and coaxial with the circumferential array of filter units, said array of filter units and said backwash arm means being confined to zones on opposite sides of said plane;
   rotational indexing means engaging said backwash arm means and actuable for angularly shifting said backwash arm means from axial alignment with one filter unit to axial alignment with another;
   axial shift means engaging said backwash arm means extension and actuable for axially disengaging and engaging said backwash arm means with said one end of said filter units, such that the backwash arm means is axially offset out of contact with said filter units during at least a portion of the rotational indexing thereof, said axial shift means comprising at least one cam follower member and at least one cam member having an axially modulated camming face axially opposed to and contacting said cam follower member, one said member being fixedly located on said housing means and the other being fixedly located on said arm conduit extension and rotatable therewith for axially shifting said arm conduit extension in response to rotation thereof, said cam and cam follower members being relatively located in correspondence to said filter units to offset the backwash arm means from said plane of said filter units during rotation thereof.

7. A filter assembly for removing contaminants from a fluid, comprising:
   closed, hollow housing means;
   a plurality of individual filter units circumferentially arranged in said housing means;
   means compartmenting said housing means for channeling a contaminated fluid to be filtered in a filtering direction through said filter units from one end of each thereof and for receiving filtered fluid from the other ends of said filter units, said one ends of said filter units lying substantially in a plane;
   a rotatable backwash arm means in at least one end of said housing means and rotatable into engagement with the said one ends of successive said filter units for backwash fluid flow communication therewith, said rotatable backwash arm means comprising a crank-shaped conduit having a central extension extending from said one end of said housing means in sealed and rotatably and axially movable relation therewith, the rotational axis of said backwash arm means being substantially perpendicular to said plane and coaxial with the circumferential array of filter units, said array of filter units and said backwash arm means being confined to zones on opposite sides of said plane;

rotational indexing means engaging said backwash arm means and actuable for angularly shifting said backwash arm means from axial alignment with one filter unit to axial alignment with another;

axial shift means engaging said backwash arm means extension and actuable for axially disengaging and engaging said backwash arm means with said one end of said filter units, such that the backwash arms means is axially offset out of contact with said filter units during at least a portion of the rotational indexing thereof, said rotational indexing means and axial shift means being carried side-by-side on said central arm extension outside said housing means, said axial shift means lying between said housing means and rotational indexing means, said axial shift means having a portion fixed to said housing means and a further portion at least axially fixed on said central arm extension and means interconnecting same and, in cooperation with rotation of said central arm extension, actuable for axially shifting same toward and away from each other.

8. The filter assembly of claim 7 including a relative rotation coupling and on-off valve means connected to the exterior end of said backwash arm means, and timing control means connected to said axial shift means, rotational indexing means and on-off valve means for cycling same in predetermined sequence wherein said valve is in its off condition with said axial shift means holding said arm means spaced from the plane of said filter unit one ends and with said rotational indexing means actuated for rotationally advancing said arm means to a new filter unit, and further wherein said valve means is on with said arm means held by opposite action of said axial shift means sealingly against a given filter unit.

9. The filter assembly of claim 7 in which a said rotatable backwash arm means and cooperative rotational indexing and axial shift means therefore are provided at each end of said housing means for respective engagement with opposite ends of a given said filter unit, and including a source of backwash fluid external of said housing means and connected to one said backwash arm means, the other backwash arm means being connected to drain backwash fluid flowing from the aligned said filter unit.

10. The filter assembly of claim 7 including a bearing seal unit on said housing means where said arm conduit passes thereinto, said bearing seal unit including a coaxial shell extending from an arm receiving opening through the wall of said housing means and of diameter sufficient to permit insertion and removal of said crank-shaped conduit from said housing means, a fixed flange extending outward from said shell at the outer end thereof, a removable annular flange releasably engageable with said first-mentioned flange, a tubular interior shell loosely disposed in said coaxial shell and secured to the inner periphery of said removable flange, said arm conduit fixedly mounting a pair of sleeve bearings axially spaced by annular flange means supporting annular seals, further annular seals surrounding said sleeve bearings near the ends thereof, said sleeve bearings snugly axially slidably and rotatably engaging the interior surface of said interior shell and said annular seals similarly bearing on said surface for axially slidably and rotatably carrying and sealing the rotatable arm means with respect to said housing.

11. The filter assembly of claim 10 in which said crank-shaped arm conduit has a bell-shaped open interior end alternatively coaxially alignable with said one end of ones of said filter units for mutual backwash flow therethrough, said crank-shaped conduit having an open exterior end extending coaxially of said circumferential array of filter units out of said one end of said housing means and forming said central extension, a U-cross section resilient annular seal coaxially received on said bell-shaped open interior end of said backwash arm means, said one end of said filter units being defined by a platelike partition comprising a portion of said compartmenting means and having openings therethrough to the interiors of respective filter units, said resilient annular seal having a free end surface facing and engageable with said platelike partition at the opposed open end of a said filter unit for providing sealed backwash communication between such given filter unit and the open interior arm end with the two coaxially aligned and the backwash arm means in its inner axial position, said axial shift means being actuable to axially force said end of said seal against said partition during backwash flow, but release such force during rotation of said backwash arm means.

* * * * *